United States Patent
Merx

(10) Patent No.: US 10,302,251 B2
(45) Date of Patent: May 28, 2019

(54) APPARATUS AND METHOD FOR SAFEGUARDING AN AUTOMATICALLY OPERATING MACHINE

(71) Applicant: PILZ GMBH & CO. KG, Ostfildern (DE)

(72) Inventor: Joachim Merx, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 237 days.

(21) Appl. No.: 14/921,680

(22) Filed: Oct. 23, 2015

(65) Prior Publication Data
US 2016/0040827 A1    Feb. 11, 2016

Related U.S. Application Data

(63) Continuation of application No. PCT/EP2014/057572, filed on Apr. 15, 2014.

(30) Foreign Application Priority Data

Apr. 26, 2013  (DE) .................. 10 2013 104 265

(51) Int. Cl.
*F16P 3/14* (2006.01)
*G05B 9/02* (2006.01)

(52) U.S. Cl.
CPC ............. *F16P 3/142* (2013.01); *G05B 9/02* (2013.01)

(58) Field of Classification Search
CPC ................................. F16P 3/142; G05B 9/02
See application file for complete search history.

(56) References Cited

U.S. PATENT DOCUMENTS 7,286,895 B2  10/2007  Krieg
7,783,386 B2   8/2010  Merte et al.
(Continued)

FOREIGN PATENT DOCUMENTS

CN      1782486 A     6/2006
CN    101018973 A     8/2007
(Continued)

OTHER PUBLICATIONS

International Search Report for PCT/EP2014/057572; dated Aug. 8, 2014; 10 pp.
(Continued)

*Primary Examiner* — Robert E Fennema
*Assistant Examiner* — Marzia T Monty
(74) *Attorney, Agent, or Firm* — Harness, Dickey & Pierce, P.L.C.

(57) ABSTRACT

An apparatus for safeguarding a monitoring area, in which an automatically operating machine is disposed, comprises: (i) a sensor unit including a camera system for producing images of the monitoring area; (ii) a configuration unit for defining first and second protection areas; and (iii) an evaluation unit for triggering a safety-related function. The first protection area is at a first distance from the machine and the second protection area is at a second greater distance from the machine. The sensor unit monitors both the first protection area and the second protection area. The evaluation unit analyzes the images produced by the camera system so as to evaluate both (i) whether a machine element of the machine enters the first protection area as well as (ii) whether a foreign object enters the second protection area. The evaluation unit triggers the safety-related function if at least one of these events occurs.

16 Claims, 4 Drawing Sheets

(56) References Cited

U.S. PATENT DOCUMENTS

| | | | |
|---|---|---|---|
| 8,988,527 B2 | 3/2015 | Haussmann et al. | |
| 9,151,446 B2 | 10/2015 | Doettling et al. | |
| 2003/0076224 A1* | 4/2003 | Braune | F16P 3/142 340/500 |
| 2005/0207618 A1 | 9/2005 | Wohler et al. | |
| 2006/0049939 A1 | 3/2006 | Haberer et al. | |
| 2008/0021597 A1* | 1/2008 | Merte | F16P 3/141 700/255 |
| 2009/0171505 A1 | 7/2009 | Okazaki | |
| 2009/0268029 A1* | 10/2009 | Haussmann | F16P 3/14 348/153 |
| 2010/0191372 A1 | 7/2010 | Nihei et al. | |
| 2011/0273723 A1 | 11/2011 | Haberer et al. | |
| 2014/0244037 A1* | 8/2014 | Scott | B25J 9/1694 700/253 |

FOREIGN PATENT DOCUMENTS

| | | |
|---|---|---|
| CN | 101346744 A | 1/2009 |
| CN | 101542184 A | 9/2009 |
| DE | 10 2004 041 821 A1 | 3/2006 |
| DE | 10 2007 007 576 A1 | 8/2008 |
| DE | 10 2010 005 708 A1 | 7/2010 |
| DE | 10 2009 050 850 A1 | 4/2011 |
| EP | 0 179 252 A2 | 4/1988 |
| EP | 1 367 314 A2 | 12/2003 |
| EP | 1 543 270 B1 | 6/2005 |
| EP | 1 635 107 A1 | 3/2006 |
| EP | 2 053 538 A1 | 4/2009 |
| EP | 2 386 876 A1 | 11/2011 |
| EP | 2 395 274 A1 | 12/2011 |
| JP | 2005-299355 | 10/2005 |
| JP | 2007-283450 | 11/2007 |
| JP | 2010-188515 A | 9/2010 |
| JP | 2010-208002 | 9/2010 |
| JP | 2011-125975 A | 6/2011 |
| JP | 2012-223831 A | 11/2012 |
| WO | WO 2008/004487 A1 | 1/2008 |
| WO | WO2008/098831 A1 | 8/2008 |

OTHER PUBLICATIONS

English translation of International Prelimiary Report on Patentability (Chapter 1) for PCT/EP2014/057572; dated Oct. 27, 2015; 8 pp.

* cited by examiner

APPARATUS AND METHOD FOR SAFEGUARDING AN AUTOMATICALLY OPERATING MACHINE

CROSS-REFERENCES TO RELATED APPLICATIONS

This application is a continuation of international patent application PCT/EP2014/057572, filed on Apr. 15, 2014 designating the U.S., which international patent application has been published in German language and claims priority from German patent application DE 10 2013 104 265.1, filed on Apr. 26, 2013. The entire contents of these priority applications are incorporated herein by reference.

BACKGROUND OF THE DISCLOSURE

This disclosure relates to an apparatus for safeguarding a monitoring area in which an automatically operating machine is disposed, with a sensor unit for monitoring the monitoring area, with a configuration unit for defining at least one first and one second protection area, and with an evaluation unit for triggering a safety-related function.

The disclosure further relates to a corresponding method and a corresponding computer program for safeguarding a monitoring area in which an automatically operating machine is disposed.

With modern industrial robots that move at considerable speeds, collisions generally result in serious damage, both to the robots and to the workpieces being handled by the same. This can result in costly production outages. The safety of persons that are interacting with the automatically operating robots also has the highest priority. With modern industrial robots and other machines with moving machine elements, the movement of which constitutes a risk for persons and other objects, a collision between the moving machine elements and a foreign object must therefore be prevented from occurring by using safety devices. For this it is usually sufficient to bring the machine to a standstill before an unintentional contact occurs.

Traditionally, hazard areas around automatically operating machines are fenced off with mechanical barriers in the form of protection fences and protection doors and/or using light barriers, light grids and laser scanners. Once a person opens a protection door or interrupts a light grid or a light barrier, a switch-off signal is produced, with which the hazardous working displacement of the machine is stopped. The installation of such safety devices is however rather expensive and the safety devices require a lot of space around a hazardous machine. Moreover, such safety devices are not very flexible when it comes to adapting the safeguarding of the hazardous working area to different operating situations of the machine.

In order to avoid said disadvantages, there have been efforts for some time to implement the safeguarding of the hazardous working area of an automatically operating machine using camera systems and suitable image processing. One such system is distributed by the applicant under the name SafetyEYE.

EP 1 543 270 B1 discloses such a system with at least two cameras, which cyclically produce images of the hazardous working area. The images from the cameras are analyzed with at least two algorithmically different methods, wherein the hazardous working displacement of the machine is stopped if at least one of the two methods results in detection of a foreign object in a previously defined protection area. Each of the two analysis methods produces 3D information from the images from the cameras, so that the position of objects in the defined protection area can be determined using the methods. A great challenge for such methods and apparatuses is that the already complex image processing has to be implemented fail-safe in the sense of relevant standards for machine safety, in particular EN 954-1 (obsolete), EN ISO 13849-1, IEC 61508 and EN ISO 13855, so that such an apparatus can actually also be used for safeguarding a hazardous machine. A failure of the apparatus itself may not result in the safeguarding of the machine being lost. An apparatus below that at least achieves Category 3 according to EN 954-1, SIL 2 according to IEC 61508 and/or the Performance Level PL (d) according to EN ISO 13849 therefore qualifies as fail-safe in this sense. The method known from EP 1 543 270 B1 and a corresponding apparatus can achieve this and have already proved themselves in practical applications.

An increasingly occurring desire under the aforementioned topic is for the improvement of the man-machine interaction. The focus here mainly lies in developing the safety systems to enable people to work in immediate proximity to a hazardous machine without this causing a risk to the people, but also without the machines being unintentionally shut down too often because of the persons present in the immediate vicinity thereof. For example, it is desirable that a person can remain in the basically hazardous surroundings of a robot while the robot is working in order to monitor the working processes of the robot in situ or in order to process a workpiece simultaneously or alternately with the robot. Nevertheless, it must further be ensured that the person is not injured by the working displacements of the robot.

With the aforementioned camera-based safety systems, mainly virtual protection areas must be defined around the machine. The camera system then detects whether a foreign object enters such a protection area and then switches off the machine or brings the machine into a safe state. In order to be able to guarantee sufficient safety, the protection areas for this are defined at a relatively large distance around the machines. The safety distances to be maintained are based on the standards EN ISO 13855: 2010 and EN ISO 13857: 2008.

The general formula for calculating the minimum distance reads:

$$S=K\cdot(t_1+t_2)+C+Z_g$$

where:
  S=minimum distance in mm measured from the start of the protection area to the source of the hazard;
  K=approach speed with which the object to be detected approaches the hazard area in mm/s (for the aforementioned camera-based safety systems this is mostly assumed to be K=1600 mm/s);
  $t_1$=response time of the safety system (for the aforementioned camera-based safety systems this is generally assumed to be $t_1$=0.34 s);
  $t_2$=response time of the machine (e.g. robot, assumed to be 0.7 s);
  $Z_g$=allowance for measurement tolerance of the safety system;
  C=penetration depth. This is defined as the distance by which a body part can move past the safety device towards the hazard area before the safety device is triggered.

An exemplary, realistic calculation of the safety distance for the aforementioned camera-based safety systems would be given by the following:

$$S = K \cdot (t_1 + t_2) + C + Z_g$$
$$= 1600 \text{ mm/s} \cdot (0.34 \text{ s} + 0.7 \text{ s}) + 850 \text{ mm} + 316 \text{ mm}$$
$$= 2.83 \text{ m}$$

The magnitude of said safety distance is usually determined by the maximum working area to be reached by the robot if the robot does not have a mechanical stop. This means that the safety area surrounds the robot relatively widely. Bearing in mind that most robots actually only very rarely use their maximum possible working area in practice, a value of 3 m starting from the maximum working area of the robot to be reached appears to be generous or large. As a result the required safety level can indeed be guaranteed, but this takes up a great deal of space. This would thus also make it difficult to install a plurality of robots adjacent to each other in a relatively small space, which would prove disadvantageous particularly in production halls with a plurality of such robots. It would therefore be desirable in principle to be able to limit the spatial extent of the virtual protection areas somewhat without this adversely affecting the safety to be guaranteed.

DE 10 2007 007 576 A1 proposes a method and an apparatus for safeguarding the hazardous working area of a robot, wherein a 3D image of the working area is produced and a kinematic human model is associated with a person present within the working area. The 3D image is analyzed as to whether the actual state of the working area deviates from a target state of the working area, wherein the target positions of the person are taken into account by means of the kinematic human model. Said method and the corresponding apparatus should enable human-robot collaboration. Because of the target-actual comparison, a person in the working area of the robot must however move exactly according to the target state in the kinematic human model. Suitable modelling appears complex and it limits flexibility in any case, because adaptation to new operating situations requires new modelling in each case. Moreover, DE 10 2007 007 576 A1 proposes the use of scanners as sensor units, which have a single-fault tolerance according to category 3 of the EN 954-1. Furthermore, a cyclical or continuous check of the functionality of the sensor units is proposed, and the displacement of the robot during the checking phase should be monitored using safety-related technology, such as for example by redundant recording and analysis of the axial positions of the robot-system. However, DE 10 2007 007 576 A1 contains no information about the analysis of the 3D images and the underlying modelling being able to provide the fail safety necessary for the safeguarding of hazardous working areas.

EP 1 635 107 A1 approaches the problem of defining very small protection areas by coupling an evaluation unit for defining a hazard area to the machine control unit of the machine, and by designing the evaluation unit to derive the parameters necessary for the definition of the hazard area from the control signals used by the machine control unit for displacement control of the machine. The parameters necessary for the definition of the hazard area are also determined based on the parameters used for the machine control unit (e.g. position, speed of displacement and direction of displacement of the robot arm). The hazard area thus moves dynamically, i.e. with the robot arm. The machine itself is by definition always disposed within the hazard area for this. Such a dynamic definition of the hazard area or protection area would be relatively space-saving under ideal conditions. However, the implementation of such a dynamic definition of the protection area is not only very complex in practice, it also requires high computing costs. Furthermore, it appears doubtful whether such a closely dimensioned protection area (immediately around the machine to be safeguarded) can guarantee the required safety level in practice. Besides, the method and the associated apparatus disclosed in EP 1 635 107 A1 are only suitable for fail-safe machines or robots. This means that the machine control unit itself should be configured to be fail-safe and redundant. The method and the apparatus are, however, not suitable for non-safe robots or machines. The method and the apparatus presuppose that the machine or the robot actually also moves according to the programmed machine control unit. A malfunction of the machine or of the robot is in any case not detectable by means of the camera-based monitoring sensor.

SUMMARY OF THE INVENTION

It is an object to specify a fail-safe apparatus and a method of the aforementioned type that enable, in a very simple and efficient manner, the flexible presence of persons in the hazardous zone of an automatically operating machine, wherein the safeguarding of the machine and the necessary failure safety for such an application are guaranteed. In particular, the safety distance between the machine and the protection area to be established should be able to be reduced compared to the hitherto standard safety distance calculation without the safety of persons and machine being adversely affected as a result. As used herein and in the claims, the term "fail-safe" refers to an apparatus that at least achieves Category 3 according to EN 954-1, SIL 2 according to IEC 61508 and/or the Performance Level PL (d) according to EN ISO 13849.

In accordance with an aspect of the present disclosure, a fail-safe apparatus for safeguarding a monitoring area, in which an automatically operating machine is disposed, is provided. The apparatus comprises (i) a sensor unit for monitoring the monitoring area, wherein the sensor unit comprises a camera system for producing images of the monitoring area; (ii) a configuration unit for defining at least a first protection area and a second protection area; and (iii) with an evaluation unit for triggering a safety-related function. The first protection area is at a first distance from the machine. The second protection area is at a second distance from the machine, wherein the second distance is larger than the first distance. The sensor unit monitors both the first protection area and the second protection area. The evaluation unit is configured to analyze the images produced by the camera system so as to evaluates both (i) whether a machine element of the machine enters the first protection area as well as (ii) whether a foreign object enters the second protection area. The evaluation unit is configured to trigger the safety-related function if it is detected that a machine element of the machine enters the first protection area and/or a foreign object enters the second protection area.

In accordance with another aspect of the present disclosure, a method for fail-safely safeguarding a monitoring area, in which an automatically operating machine is disposed, is presented. The method includes the following steps:

providing a sensor unit for monitoring the monitoring region, wherein the sensor unit comprises a camera system for producing images of the monitoring area defining at least a first protection area and a second protection area, wherein the first protection area is at a first distance from the machine and the second protection area is at a second distance from the machine, wherein the second distance is larger than the first distance, monitoring both the first protection area and the second protection area with the sensor unit, analyzing the images produced by the camera system so as to evaluate both (i) whether a machine element of the machine enters the first protection area as well as (ii) whether a foreign object enters the second protection area, and triggering a safety-related function if it is detected that a machine element of the machine enters the first protection area and/or a foreign object enters the second protection area.

In accordance with a further aspect of the present disclosure, a computer program for safeguarding a monitoring area, in which an automatically operating machine is disposed, is presented. The computer program comprises program code means which, when executed on a computer, carry out the following steps:

monitoring the monitoring region by controlling a camera system to produce images of the monitoring area;

defining at least a first protection area and a second protection area, wherein the first protection area is at a first distance from the machine and the second protection area is at a second distance from the machine, wherein the second distance is larger than the first distance, monitoring both the first protection area and the second protection area with the camera system, analyzing the images produced by the camera system so as to evaluate both (i) whether a machine element of the machine enters the first protection area as well as (ii) whether a foreign object enters the second protection area, and triggering a safety-related function if it is detected that a machine element of the machine enters the first protection area and/or a foreign object enters the second protection area.

The new apparatus, the new method and the new computer program inter alia include the aspect that two protection areas which are spaced apart from one another are defined. In contrast to the otherwise usual approach, with which the detection of foreign objects approaching the working area of the machine is essentially focused upon using the defined protection areas, here a protection area (the first protection area) of the machine itself is monitored, whereas the other protection area (the second protection area) is used for the detection of foreign objects (e.g. persons) approaching the machine. The new apparatus thus monitors the monitoring area on both sides, i.e. starting from the machine to determine whether parts of the machine itself enter the first protection area from within so to speak, and also starting from the surroundings of the machine to determine whether foreign objects so to speak enter the second protection area from the outside. With said dual sided approach it can thus also be detected whether the machine itself unintentionally exits its usual working area. In this case, parts of the machine, referred to here as machine elements, would enter the first protection area, whereby the safety-related function is then triggered by the evaluation unit.

A significant advantage of the new apparatus is that the same can also be used for "unsafe" machines or robots, in particular because of the additional external monitoring of the machine. Automated operating machines, which are themselves not implemented so as to be redundant and safe in the aforementioned sense, can now be additionally safeguarded by the apparatus. When in doubt, it is even more important, however, that the distance of the virtually defined protection areas of the machine, in particular the second distance of the second protection area of the machine, can be reduced compared to known safety systems of this type. This enables, in particular for production lines with a plurality of automatically operating machines disposed adjacent to each other, the machines to be disposed at a relatively short distance from each other because the safeguarded monitoring area of each individual machine can be reduced in total. This also simplifies man-machine cooperation. The magnitude of the safety distance S, as explained above, can be determined according to the standards EN ISO 13855:2010 and EN ISO 13857:2008 based on the maximum possible working area of the machine (if this does not comprise a mechanical stop). However, because the machine is now additionally monitored using the apparatus and it is determined whether the machine enters the first protection area, which is disposed about the machine, the first protection area and hence also the second protection area can be disposed at a shorter distance from the machine.

The first protection area is preferably defined depending on an actually programmed working area of the machine. The reduction of the safety distance compared to the aforementioned, standardized safety distance calculation is thus based on the definition of the first protection area, which is referred to in the present section, at the boundary of the programmed working area of the machine in addition to the outer protection area (2nd protection area), which detects the ingress of foreign objects. Said first protection area has the task of monitoring the programmed working area of the machine for compliance. If the machine should now depart from said programmed working area as a result of a defect in the system or even as a result of a change in its programming without adaptation of the safety distance, then the evaluation unit would also trigger the safety-related function, which generally either results in switching off the machine or brings the machine into a safe state.

The two protection areas defined here are not to be confused with the first and second degree hazard areas mentioned in EP 1 635 107 A1. That is to say that the hazard areas mentioned therein are not used for monitoring the machine itself, but are both concerned with the external view in order to detect the approach of foreign objects to the machine from the outside. The hazard area of the first degree defined in EP 1 635 107 A1 defines a region of relatively low hazard, the penetration of which by a foreign object causes triggering of an audible or visual warning signal. The hazard area of the second degree, which lies closer to the machine, defines a region of greater hazard, the penetration of which by a foreign object triggers bringing the machine to a complete standstill. EP 1 635 107 A1 uses a two-stage model so to speak, which only focuses on the external view in each case, but does not check whether the machine itself departs from its programmed working area.

In contrast to the apparatus known from EP 1 635 107 A1, the herein presented apparatus can therefore also be used for non-safe machines. The definition of the two protection areas can incidentally also be achieved very much more simply and in a much less complicated way than is the case in EP 1 635 107 A1.

In a refinement, the first protection area is defined depending on an actually programmed working area of the machine and the second protection area is defined depending on the first protection area. The difference between the second distance and the first distance corresponds to a defined safety distance.

The safety distance S is thus not defined as is usual based on the maximum reach of the machine (maximum space), but based on the actually programmed working area of the machine (operating space). In the aforementioned example calculation, a safety distance of S=2.83 m was calculated. Because of the additional safeguarding of the machine by the first protection area, said safety distance S can be defined based on the operating space, and not as is otherwise usual based on the maximum space of the machine. The outer lying second protection area can thus be disposed at a total distance from the center point of the machine that corresponds to the sum of the programmed deflection of the machine and the safety distance S. Compared to the usual approach, said implementation results in a reduction of the total distance of the second protection area of the machine by the difference: "maximum working area of the machine (maximum space)"–"programmed working area of the machine (operating space)".

The first distance is defined for this as the distance between the machine and an inner limit of the first protection area. By contrast, the so-called second distance is defined between the machine and an outer limit of the second protection area. Inner limits are understood to be parts of the respective protection areas that, when viewed from the machine, are nearer the machine, i.e. in contrast to the outer limit of the respective protection area they are at a smaller distance from the machine at the respective point. Accordingly, outer limits are understood to be parts of the respective protection areas that, when viewed from the machine, are further from the machine, i.e. in contrast to the inner limit of the respective protection area they are at a greater distance from the machine at the respective point. The respective protection areas thus extend between their inner and outer limits. The width or thickness of the protection areas, i.e. the distance between the inner and outer limits of the respective protection area, is preferably defined depending on the system. It depends inter alia on the response time of the sensor as well as on the response time of the analysis process. The reason why the second distance is based on the outer limit of the second protection area and the first distance in contrast to this is based on the inner limit of the first protection area, should be evident against the background of the aforementioned remarks. The second protection area is used for monitoring "from the outside", which is why in particular its outer limit is important. The first protection area is used for monitoring "from the inside", which is why in particular its inner limit is important.

In a refinement, the defined safety distance is dependent at least on an estimated approach speed of a foreign object that is approaching the machine, on a switch-off time of the machine and on a response time of the sensor unit.

Because of the additional safeguarding of the machine by means of the first protection area, the reduction of the safety distance between the first and second protection areas does not result in a hazard situation because the operator is at an adequate distance from the danger point. It only has to be assessed whether it is likely that the machine has just had a defect in its control system and a person is entering the second protection area from the outside at the same time. If said events have to be assumed at the same time, then the safety distance is to be calculated based both on the approach speed of the foreign object (of the operator) and also based on the stopping distance of the machine. If said extreme case can be excluded, however, and this appears always to be sensible if the person does not have to enter the protection area cyclically (for example to remove or deliver material), then it is sufficient to dimension the safety distance based on the speed of approach of the person.

In a refinement, the configuration unit comprises an input module for defining the first and/or of the second protection areas.

This can for example be achieved with an input panel or an external input device (e.g. a computer) that is connected to the configuration unit of the apparatus. In this way, the two protection areas can be manually defined. Because of the definition of the second protection area depending on the first protection area, the manual input of the first protection area is mostly sufficient. In practice, this can for example be carried out by positioning reference markers around the machine, by means of which the first protection area is defined. Because the first protection area is preferably defined depending on the actually programmed working area of the machine, the reference points are positioned in this case at the actually programmed outer deflection points of the machine. Simplified, this could also guarantee thereby that the actually programmed maximum deflection of the machine (not to be confused with the maximum possible deflection of the machine) is measured and the first protection area is then defined in a circular form at said radial distance about the machine. It will be understood, however, that the first protection area can also be accurately defined using the input module, so that the same is not then formed in a circular form about the machine, but in an arbitrary pattern corresponding to the actually programmed working displacement of the machine. In this case, because of the dependent definition of the second protection area, the second protection area will also comprise the same or a similar geometric shape.

In an alternative refinement, the configuration unit is coupled to the machine control unit, which controls the displacements of the machine, in order to be able to define the first protection area using parameters that are used for displacement control of the machine.

In said refinement, the machine control unit thus directly delivers the parameters that are required for definition of the first protection area. The definition of the first protection area and hence also of the second protection area can thus be carried out automatically depending thereon. This enables not only a more accurate definition of the protection areas at the actually programmed displacement of the machine, but also reduces the installation time of the apparatus considerably. A further advantage is that a change of the machine displacement, i.e. a change of the machine programming, also automatically results in a corresponding adaptation of the two protection areas. With the manual definition of the two protection areas described above, there is by contrast the possibility that the operator also forgets to amend the protection areas accordingly in the event of a change of the machine programming. However, this case would also be safeguarded with the new apparatus. If the machine were in fact to enter the first protection area during the newly programmed displacement, the safety-related function would be triggered immediately without a hazardous collision being able to occur.

In a further refinement, the safety-related function results in switching off the machine or, if it is detected that the machine enters the first protection area, in an adaptive adjustment of the second protection area, in particular of the second distance.

An emergency switch-off or emergency stoppage of the machine is the usual result if the machine enters the first protection area. Alternatively, the second protection area can also be suitably adapted in the case of such ingress by the machine into the first protection area. In this case the sensor device detects the penetration depth of the machine into the first protection area, the evaluation unit evaluates this and then suitably amends the safety distance between the first and the second protection areas by the detected and evaluated penetration depth. Instead of switching the machine off, the machine could as a result be kept in operation without a loss of safety occurring.

In a further refinement, the first and the second protection areas are configured as virtual, three-dimensional protection areas that at least partly surround the machine.

The two protection areas preferably fully surround the machine only if the machine has a working radius of 360°. Otherwise it is sufficient if the two protection areas only externally shield the actually programmed working area of the machine. As mentioned, the protection areas are preferably configured as virtual three-dimensional protection areas. The protection areas can therefore also be referred to as protection spaces. They can also fully shield around the machine, i.e. both upwards and laterally. The thickness of the protection areas measured in the radial direction from the center point of the machine preferably corresponds in this case at least to the detectable penetration depth C. The thickness of the protection areas should, as already mentioned, be defined depending on the system and should therefore preferably also depend on the response time of the sensor and of the assessment process.

In a further refinement, the sensor unit comprises a multi-channel redundant, multiocular camera system.

One such camera system is disclosed in EP 1 543 270 B1, the disclosure content of which is hereby incorporated in full by reference. One such camera system is distributed by the applicant under the name SafetyEYE.

In a further refinement, the sensor unit is configured to determine a distance value that is representative of the spatial position of at least one foreign object, wherein the distance value is determined by a transition time measurement and/or by a stereoscopic comparison of two camera images.

During a transition time measurement process the transition time of a signal, in particular of a light signal, to a foreign object and back is measured. The distance to the foreign object can be determined from the known propagation speed of the signal. Transition time measurement processes are a very inexpensive option for obtaining distance information and for enabling a three-dimensional image analysis.

Stereoscopic methods for determining distance information resemble the operation of the human eye in that they determine the distance to an object using the so-called disparity that arises in the at least two camera images because of the slightly different viewing angle. It will be understood that said embodiment also includes trinocular methods and apparatuses, i.e. said embodiment is not limited to the use of exactly two cameras or two camera images. The three-dimensional monitoring of a monitoring area using a stereoscopic method is particularly well suited to the preferred use, as redundant systems are advantageous in relation to single failure safety. A stereoscopic system can make optimal use of the existing multiple cameras or image acquisition units.

It will be understood that the aforementioned configurations do not only relate to the apparatus defined in the claims, but also to the method. Accordingly, the new method has the same or similar configurations as or to the new apparatus.

In a refinement of the method according to the disclosure, the first protection area is defined depending on an actually programmed working area of the machine, and the second protection area is defined depending on the first protection area.

In a further refinement of the method, the difference between the second distance and the first distance is a defined safety distance, which is at least dependent on an estimated speed of approach of a foreign object that is approaching the machine, on a switch-off time of the machine and on a response time of the sensor unit.

In a further refinement of the method, said method further comprises the following steps: controlling displacements of the machine by means of a machine control unit; defining the first protection area using parameters that are used for displacement control of the machine.

In a further refinement of the method, said method comprises the following process step: adaptive adjustment of the second protection area, in particular of the second distance, if ingress by the machine into the first protection area is detected.

In a further refinement of the method, said method comprises the following process step: determining a distance value representative of the spatial position of at least one foreign object, wherein the distance value is determined by a transition time measurement process and/or by a stereoscopic comparison of two camera images.

It will be understood that the features mentioned above and yet to be described below can not only be used in the respectively stated combination, but also in other combinations or on their own, without departing from the spirit and scope of the present disclosure.

DESCRIPTION OF PREFERRED EMBODIMENTS

Figure 1:
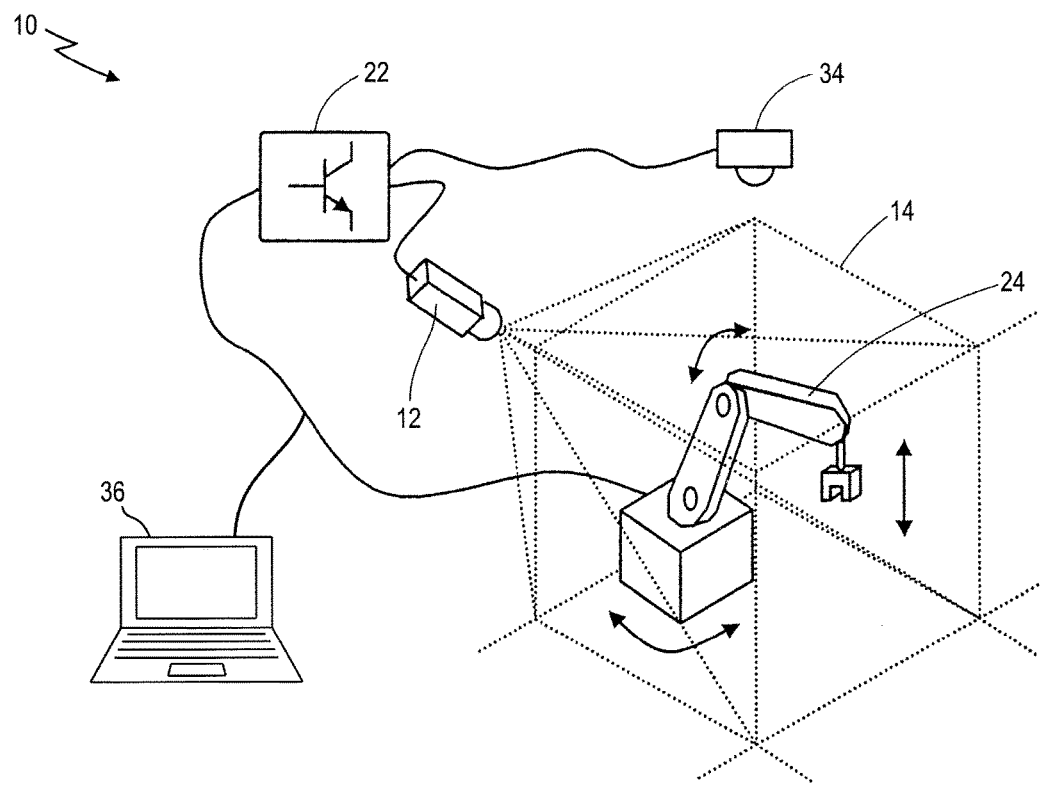
FIG. 1 shows a simplified representation of the new apparatus.
Figure 2:
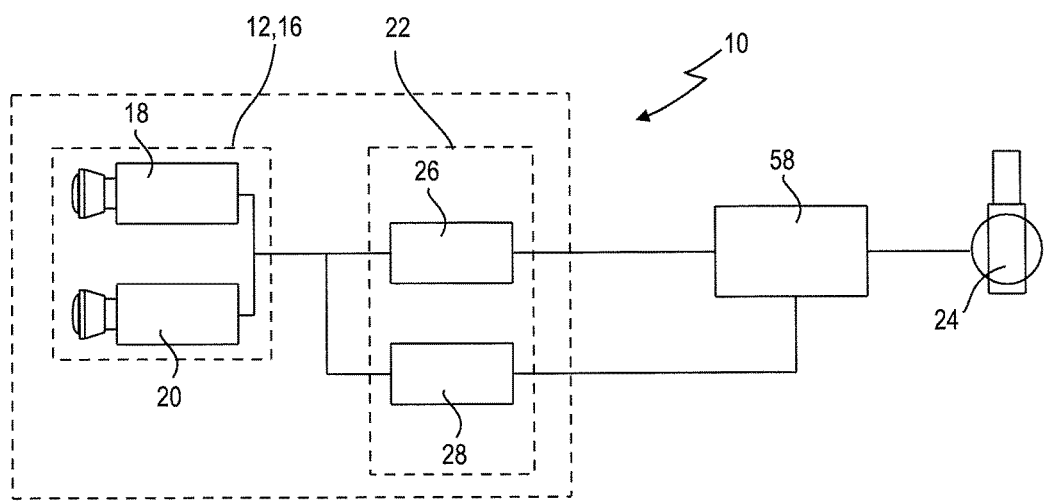
FIG. 2 shows a simplified representation of the new apparatus in a block diagram

In FIGS. 1 and 2, a preferred exemplary embodiment of the new apparatus in its entirety is denoted by the reference numeral 10.

The apparatus 10 contains at least one sensor unit 12, which is designed to monitor a spatial area or monitoring area 14 in which an automatically operating system or machine, in this case a robot 24, is disposed. For this purpose, the sensor unit 12 preferably comprises a camera system 16 that is oriented towards the monitoring area 14. The camera system 16 is preferably configured in the form of a stereo camera system comprising at least a first camera 18 and a second camera 20. The cameras 18, 20 provide two slightly mutually offset images of the monitoring area to be safeguarded 14. Because of the offset of the cameras 18, 20 relative to each other and using trigonometric relationships, the distance from the sensor unit 12 to objects in the monitoring area 14 can be determined using the camera images. A preferred sensor unit of this type is disclosed in the aforementioned EP 1 543 270 B1. In other exemplary embodiments, the sensor unit 12 can contain a transition time camera. The means a camera that on the one hand produces 2D images of a region to be monitored. Moreover, the camera provides distance information obtained from a transition time measurement. The sensor unit 12 can also be designed to operate as a 3D Scanner and/or can use a different technology that enables 3D images of a monitoring area to be safeguarded to be produced.

Moreover, in other exemplary embodiments a plurality of 1D and/or 2D sensors in pairs and/or as a whole can form a 3D-sensor unit that provides the required 3D images of the monitoring area 14. It is thus not absolutely necessary, although it is preferred, to use a stereo camera system 16 as a sensor unit 12 for the new apparatus 10.

The sensor unit 12 is connected to a controller 22. The controller 22 is designed to analyze the images of the monitoring area 14 acquired by the camera system 16 and depending thereon to bring the robots 24 to a standstill or into a safe state if a hazardous situation is detected. In a departure from the representation in FIG. 1, the sensor unit 12 and the controller 22 can also be integrated within a common housing. The controller 22 preferably comprises an evaluation unit 26 and a configuration unit 28 (see FIG. 2). The evaluation unit 26 is configured to analyze the camera images recorded by the camera system 16 and in the case of a hazardous situation to trigger a safety-related function, for example switching off the robot 24. The configuration unit 28 by contrast is used for the definition of at least two virtual protection areas 30, 32, as described in detail below using FIGS. 4 and 5.

The evaluation unit 26 and the configuration unit 28 can either be implemented as separate units, both software-based and also hardware-based. Alternatively, said two units 26, 28 can also be implemented in a common software-based or hardware-based unit within the controller 22. The connections shown in FIG. 1 between the sensor unit 12, the controller 22 and the machine 24 can each be configured as wired or wireless connections. A light source denoted by the reference numeral 34 can optionally be provided to illuminate the monitoring area 14. In some exemplary embodiments of the apparatus 10, the light source 34 can be used to produce light signals, from the transition time of which the distance to objects in the monitoring area 14 can be determined. In the currently preferred exemplary embodiments, the light source 34 is however used only for the illumination of the monitoring area 14. A 3D recording of the monitoring area 14 is carried out, as already mentioned above, preferably using stereoscopic image recording.

Furthermore, FIG. 1 also shows schematically an input module, which is denoted by the reference numeral 36. Said input module 36 can be used for the installation and configuration of the apparatus 10, in particular of the sensor unit 12. It is used in particular, as described in detail below, for the manual adjustment of and configuration of the virtual protection areas 30, 32. The input module 36 can be adapted to the apparatus 10 as a dedicated input panel. Alternatively, the input module can also be implemented by a conventional computer on which software is installed that is suitable for the installation and configuration of the apparatus 10.

Furthermore, it should be mentioned that the apparatus 10 can also contain a plurality of evaluation units 26 that are interconnected by means of a bus or by a different communications medium. Moreover, it is possible that a part of the signal and data processing capacity of the sensor unit 12 is located in the evaluation unit 26. For example, the determination of the position of an object using the stereo images of the cameras 18, 20 can be carried out in a computer that also implements the evaluation unit 26. Also the sensor unit 12 does not necessarily have to be located in a single housing. Rather, the sensor unit 12 can also be distributed in a plurality of modules and/or housings, although it is preferred to implement the sensor unit 12 as compactly as possible.

Figure 3:
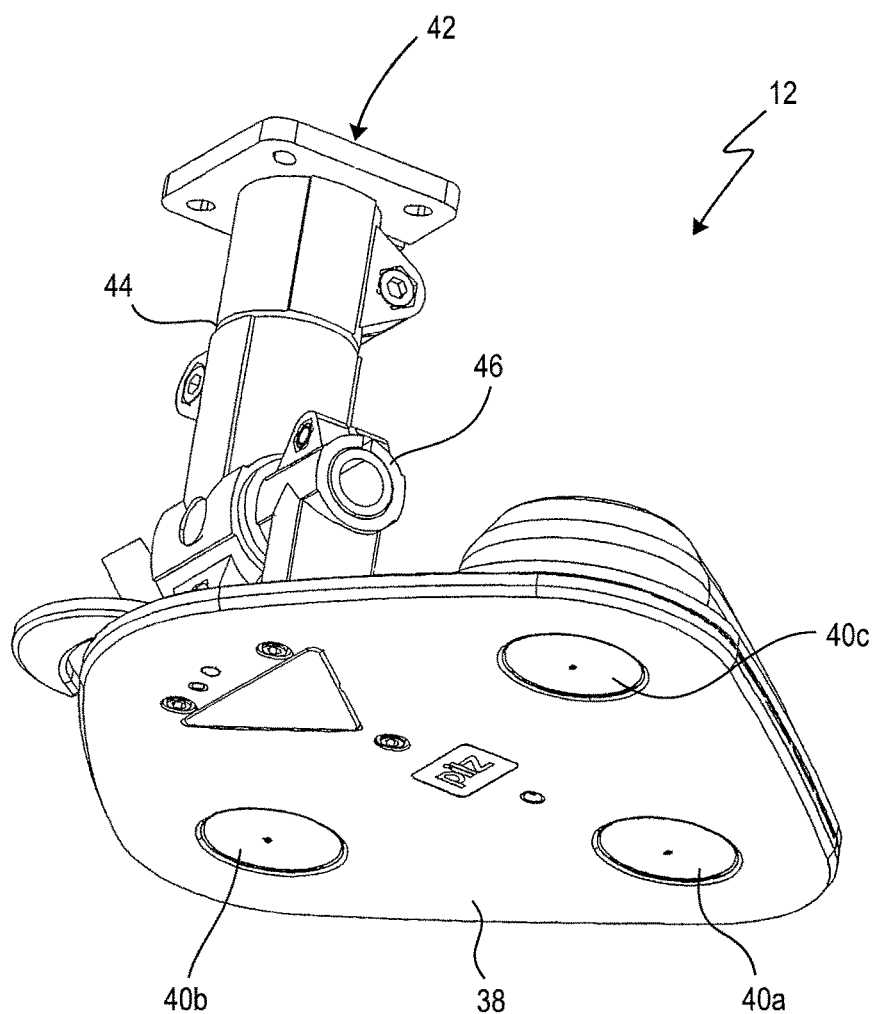
FIG. 3 shows a perspective representation of a camera system that can be used in the new apparatus at an angle from below.

FIG. 3 shows a preferred embodiment of the sensor unit 12 as distributed by the applicant under the name Safety-EYE. According to said embodiment, the sensor unit 12 comprises a system body 38 that is configured in the form of a substantially planar plate. Said plate 38 has an approximately diamond-shaped footprint here. A total of three camera units 40a, 40b, 40c are disposed in three of the four "corners" of the system body 38. A mounting part denoted by the reference numeral 42 can be used to attach the sensor unit 12 to a wall, to a mast or similar (not shown here). In this case the mounting part 42 is a mounting arm with a plurality of swivel joints 44, 46 that enable pivoting of the system body 38 about at least two mutually orthogonal axes of rotation. The system body can also preferably pivot about a third axis of rotation that is orthogonal thereto. The associated swivel joint is, however, concealed in the view of FIG. 3. The camera units 40a, 40b, 40c can thus be oriented towards the monitoring area 14 to be monitored relatively simply. The three camera units 40a, 40b, 40c span a triangle on the system body 38. The camera images produced by said camera units are thus slightly offset relative to each other. The camera units 40a, 40b or 40a, 40c respectively form a camera pair, wherein the distance of the camera units 40a, 40b from each other and the distance of the camera units 40a, 40c from each other in said exemplary embodiment are each exactly equal and invariant. Said two distances each form a base width for a stereoscopic analysis of the camera pairs 40a, 40b and 40a, 40c. In principal moreover, the camera pair 40b, 40c could also be used for a separate stereoscopic analysis. As a result of the two stereoscopic camera pairs 40a, 40b and 40a, 40c not being disposed along a common straight line, objects in the monitoring area 14 can also be detected that would not be visible to a single camera pair, for example because of being obscured by other objects. Moreover, using the three camera units 40a, 40b, 40c it is ensured that the distance can be determined to any objects in the monitoring area 14. If only two camera units were to be used, the distance to an elongated contour running parallel to the base width could not possibly be determined.

Figure 4:
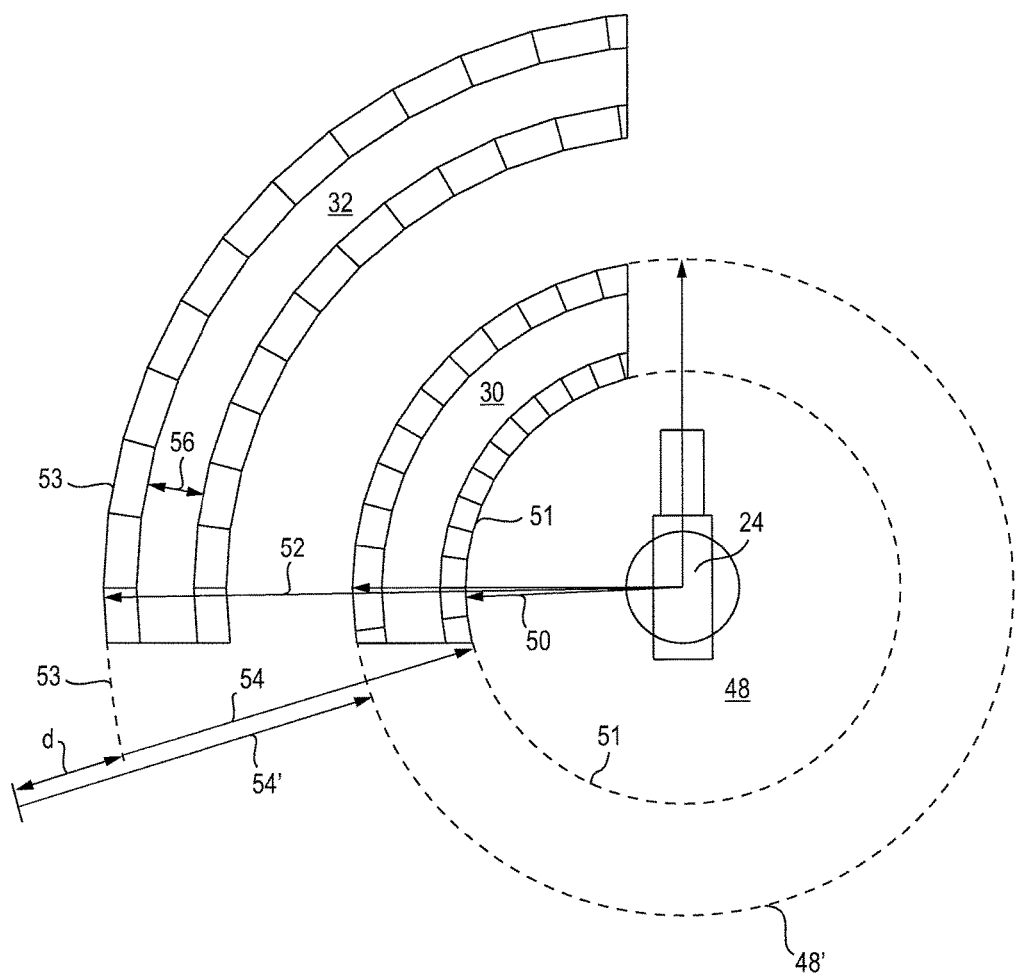
FIG. 4 shows a simplified representation to illustrate the working principle of the new apparatus and of the new method according to a first embodiment.
Figure 5:
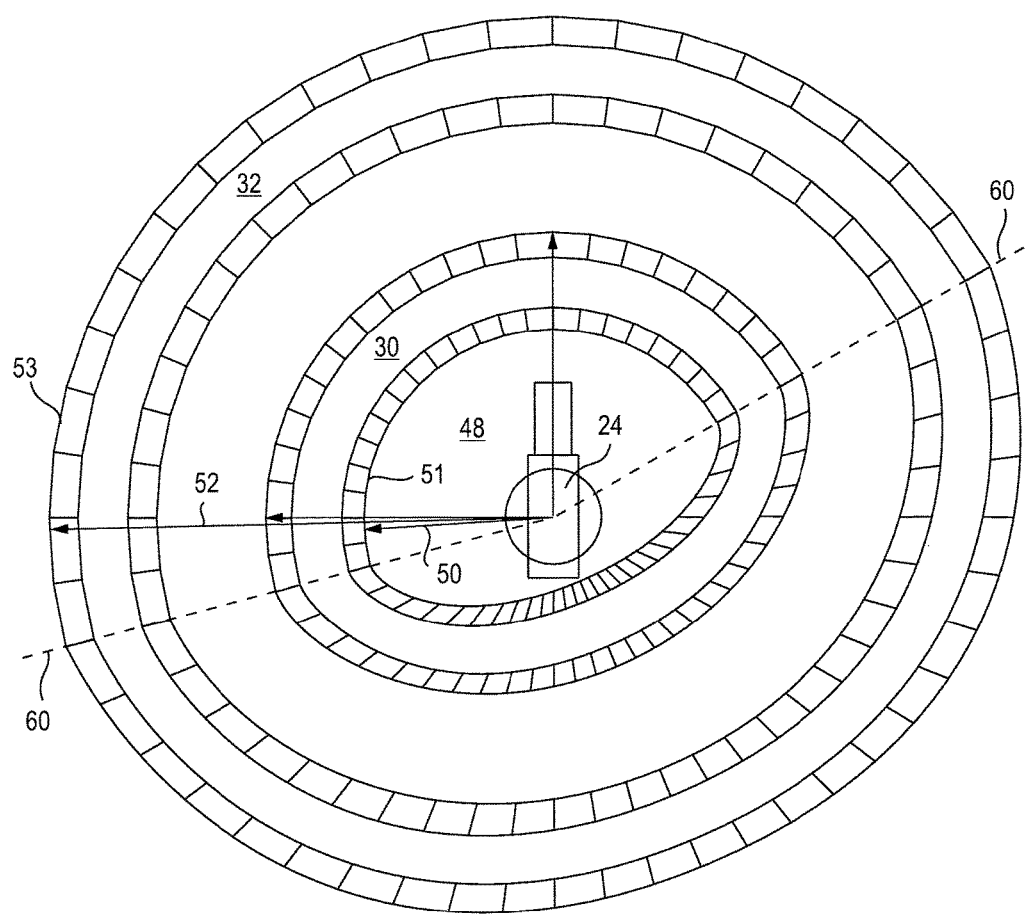
FIG. 5 shows a simplified representation to illustrate the working principle of the new apparatus and of the new method according to a further embodiment.

The definition of the protection areas 30, 32 and the function thereof is described in detail below by way of example using FIGS. 4 and 5. The apparatus 10 enables the setting up of virtual, three-dimensional protection areas 30, 32 that can be monitored by means of the sensor unit 12. The definition of the protection areas 30, 32 preferably takes place by means of the aforementioned configuration unit 28. The protection areas 30, 32 can be set up either manually or automatically by means of the configuration unit 28, preferably with software support.

There are at least two protection areas, a first protection area 30 and a second protection area 32, that are set up by the apparatus 10 in the present case. The first protection area 30 is essentially used for monitoring whether the machine 24 is compliant with its actually programmed working area 48. Said first protection area 30 is at a first distance 50 from the machine 24 and at least partly surrounds the machine. The first distance 50 is, as shown in FIGS. 4 and 5, measured from an inner limit 51 of the first protection area 50 facing the machine 24. The second protection area 32 is essentially used for monitoring whether a foreign object, for example a person, is approaching the machine 24 from the outside. Said second protection area 32 is at a second distance 52 from the machine 24 that is greater than the first distance 50 of the first protection area 30 from the machine 24. The second protection area 32 thus lies further out so to speak. In contrast to the first distance 50, the second distance 52, as shown in FIGS. 4 and 5, is measured from an outer limit 53 of the second protection area 52 that is remote from the machine 24. Both the shape and thus the distances 50, 52 of the protection areas 30, 32 can be variably defined depending on the application. This is possible for example, as already described, using the input module 36 (see FIG. 1).

The sensor unit 12 monitors both protection areas 30, 32. In the case of the embodiment shown in FIG. 3, the camera images produced by the camera units 40a, 40b, 40c thus cover the two protection areas 30, 32. In other words, the protection areas 30, 32 thus lie within the monitoring area 14. Using the evaluation unit 26, the camera images are analyzed in order to detect whether a machine element of the machine 24 enters the first protection area 30, and/or whether a foreign object enters the second protection area 32 from the outside. If one of said events should occur, the evaluation unit 26 triggers the safety-related function, whereby the machine is brought into a safe state.

In contrast to the hitherto known safety systems of this type, the apparatus 10 thus detects not only whether a foreign object is approaching the hazardous working area 48 of the machine 24 from the outside, but also whether the machine 24 itself is complying with its programmed working area 48. Because in particular the latter check is not carried out by the hitherto known safety systems, the protection spaces defined in said systems (which correspond to the second protection area 32) must be defined at a further distance from the machine 24 than can be achieved in the present case. Because in said systems, the machine 24 itself is not usually monitored for compliance with its programmed working area 48, the safety distance $(S=K \cdot (t_1+t_2)+C+Z_g)$ is usually measured from the maximum possible working area of the machine 24, which the machine could theoretically reach. Said maximum possible working area is characterized in FIG. 4 with the reference numeral 48'. Without the additional monitoring of the machine 24 itself, the protection area 32 would thus include the additional safety distance based on the maximum possible working area 48', which is indicated in FIG. 4 with the reference numeral 54' and is calculated according to the above standard formula. Thus the protection area 32 would then have to lie significantly further out, i.e. would be at a greater distance from the machine 24 than is shown in FIG. 4

Because however a second protection area 30 (known as the first protection area 30) that monitors the working area 48 of the machine 24 is set up in the present case, the total distance 52 (known as the second distance 52) of the outer limit 53 of the protection area 32 from the machine 24 can be reduced without this resulting in a loss of safety. Because the new sensor unit 12 can now detect whether the machine 24 unintentionally leaves its programmed working area 48, dimensioning the safety distance 54' based on the technically maximum possible working area 48' of the machine 24 no longer appears necessary. The indicated safety distance 54 is indeed preferably always still the same safety distance as the indicated safety distance 54', but in the present case this is measured starting from the actually programmed working area 48 and not from the theoretical maximum possible working area 48' of the machine 24.

The new apparatus 10 thus enables a reduction of the total distance between the outer edge 53 of the second safety area 32 and the machine 24. More precisely, said distance reduction corresponds to the difference between the technically maximum possible working area 48' of the machine 24 and the actually programmed working area 48 of the machine 24. Said gain in space is indicated in FIG. 4 by d.

The distance reduction, which as already mentioned is possible with the apparatus 10 without a loss of safety, proves itself as extremely advantageous in particular in production halls in which a number of automatically operating machines are installed. Because the monitoring area of each individual machine can be reduced in total as a result, this enables the arrangement of a plurality of automatically working machines with relatively small spacings between them.

The difference between the second distance 52 and the first distance 50 corresponds to the safety distance S (54) calculated above. Both protection areas preferably comprise a width 56 that corresponds to at least the recorded penetration depth C from the above formula. The width of the first protection area 30 (measured in the radial direction) preferably corresponds to the difference between the technically maximum possible working area 48' of the machine 24 and the actually programmed working area 48 of the machine 24.

Instead of a manual definition of the safety areas 30, 32 or a manual definition of their distances 50, 52 from the machine 24, this can also be carried out automatically. The configuration unit 28 can be coupled to the machine controller 58 for this purpose, as shown schematically in FIG. 2. This enables the first protection area 30 to be specified using the parameters that are used for displacement control of the machine 24. A shape of the protection areas 30, 32 could arise from these for example, as indicated in FIG. 5. In the example shown therein, the machine 24 only moves within the radius of movement 60 indicated by dashes. Pivoting of the machine 24 outside said radius of movement 60 is not envisaged. Outside of the radius of movement 60, the first and the second protection areas 30, 32 can therefore lie very close to the machine 24. The so-called first and second distances 50, 52 are variable as a result. If the displacement of the machine 24 is reprogrammed, then in the case of coupling of the configuration unit 28 to the machine control unit 48 this must automatically result in a redefinition of the protection areas 30, 32 for the new actually programmed working area 48 of the machine 24, without the same having to be reprogrammed by the operator. Because the safety distance between the second and the first protection areas 32, 30 is predetermined as standard, only the first protection area 30 has to be adapted to the new programmed working area 48 of the machine 24 in any case, because the adaptation of the second protection area 32 takes place automatically depending on the first protection area 30.

It will be understood that the two protection areas 30, 32 can of course also deviate from the round or half-round shape depending on the application. They can for example also be of an angular shape. However, the same are preferably each in the form of three-dimensional spaces, the thickness of which corresponds to at least the penetration depth C.

What is claimed is:

1. A fail-safe apparatus for safeguarding a monitoring area, in which an automatically operating machine is disposed, the apparatus comprising:
    a sensor unit for monitoring the monitoring area, wherein the sensor unit comprises a camera system for producing image data of the monitoring area;
    a configuration unit for defining at least a first protection area and a second protection area; and
    an evaluation unit for triggering a safety-related function;
    wherein the first protection area is defined by an inner boundary at a first distance from the machine and the second protection area is defined by an outer boundary at a second distance from the machine, the second distance being larger than the first distance, and wherein the first and second distances are defined relative to a stationary location associated with the machine,
    wherein the sensor unit monitors both the first protection area and the second protection area,
    wherein the evaluation unit is connected to receive said image data and is configured to analyze the image data produced by the camera system so as to evaluate, based upon said image data, both (i) whether a machine element of the machine has crossed the inner boundary and entered the first protection area from within as well as (ii) whether a foreign object has crossed the outer boundary and entered the second protection area from outside, and
    wherein the evaluation unit is further configured to trigger the safety-related function if it is detected that a machine element of the machine enters the first protection area and/or a foreign object enters the second protection area.

2. The fail-safe apparatus as claimed in claim 1, wherein the inner boundary of the first protection area is defined depending on an actually programmed working area of the machine.

3. The fail-safe apparatus as claimed in claim 1, wherein the outer boundary of the second protection area is defined depending on the first protection area and a difference between the second distance and the first distance is a defined safety distance.

4. The fail-safe apparatus as claimed in claim 3, wherein the safety distance is defined based at least on an estimated speed of approach of a foreign object that is approaching the machine, on a switch-off time of the machine and on a response time of the sensor unit.

5. The fail-safe apparatus as claimed in claim 1, wherein the configuration unit comprises an input module for defining the first protection area and/or the second protection area.

6. The fail-safe apparatus as claimed in claim 1, further comprising a machine control unit which is configured to control movements of the machine based on movement parameters, wherein the configuration unit is coupled to the machine control unit, and wherein the configuration unit is configured to define the first protection area based on the movement parameters.

7. The fail-safe apparatus as claimed in claim 1, wherein the safety-related function includes switching off the machine.

8. The fail-safe apparatus as claimed in claim 1, wherein the safety-related function includes an adaptive adjustment of the second distance if it is detected that the machine enters the first protection area.

9. The fail-safe apparatus as claimed in claim 1, wherein the first protection area and the second protection area are virtual, three-dimensional protection areas that at least partly surround the machine.

10. The fail-safe apparatus as claimed in claim 1, wherein the camera system comprises a multi-channel redundant, multi-ocular camera.

11. The fail-safe apparatus as claimed in claim 10, wherein the sensor unit is configured to determine a distance value that is representative of the spatial position of at least one foreign object, wherein the distance value is determined by a transition time measurement method and/or by a stereoscopic comparison of two images produced by the camera system.

12. A method for fail-safely safeguarding a monitoring area, in which an automatically operating machine is disposed, the method comprising the steps of:
    providing a sensor unit for monitoring the monitoring region, wherein the sensor unit comprises a camera system for producing image data of the monitoring area,
    defining at least a first protection area and a second protection area, wherein the first protection area is at a first distance from the machine and the second protection area is at a second distance from the machine, the second distance being larger than the first distance, and wherein the first and second distances are defined relative to a stationary location associated with the machine,
    monitoring both the first protection area and the second protection area with the sensor unit,
    analyzing the image data produced by the camera system so as to evaluate, based upon said image data, both (i) whether a machine element of the machine has crossed the inner boundary and entered the first protection area as well as (ii) whether a foreign object has crossed the outer boundary and entered the second protection area, and
    triggering a safety-related function if it is detected that a machine element of the machine enters the first protection area and/or a foreign object enters the second protection area.

13. The method as claimed in claim 12, wherein the first protection area is defined depending on an actually programmed working area of the machine and wherein the second protection area is defined depending on the first protection area.

14. The method as claimed in claim 12, wherein a difference between the second distance and the first distance is a defined safety distance that is defined based at least on an estimated speed of approach of a foreign object that is approaching the machine, on a switch-off time of the machine and on a response time of the sensor unit.

15. The method as claimed in claim 12, further comprising the steps of:
    controlling movements of the machine based on movement parameters, and
    defining the first protection area based on the movement parameters.

16. For a fail-safe apparatus having a programmable computer for safeguarding a monitoring area, in which an automatically operating machine is disposed, a non-transitory computer readable storage medium containing a computer program comprising program code which, when executed on said computer, performs the following steps:
    monitoring the monitoring area by controlling a camera system to produce image data of the monitoring area;

defining at least a first protection area and a second protection area, wherein the first protection area is at a first distance from the machine and the second protection area is at a second distance from the machine, the second distance being larger than the first distance, and wherein the first and second distances are defined relative to a stationary location associated with the machine, monitoring both the first protection area and the second protection area with the camera system, analyzing the image data produced by the camera system so as to evaluate, based upon said image data, both (i) whether a machine element of the machine has crossed the inner boundary and entered the first protection area as well as (ii) whether a foreign object has crossed the outer boundary and entered the second protection area, and triggering a safety-related function if it is detected that a machine element of the machine enters the first protection area and/or a foreign object enters the second protection area.

\* \* \* \* \*